(12) United States Patent
Porter (10) Patent No.: US 10,468,886 B2
(45) Date of Patent: Nov. 5, 2019

(54) ELECTRICAL SYSTEMS AND RELATED FREQUENCY REGULATION METHODS

(71) Applicant: S&C Electric Company, Chicago, IL (US)

(72) Inventor: David Glenn Porter, East Troy, WI (US)

(73) Assignee: S&C Electric Company, Chicago, IL (US)

( * ) Notice: Subject to any disclaimer, the term of this patent is extended or adjusted under 35 U.S.C. 154(b) by 342 days.

(21) Appl. No.: 15/381,816

(22) Filed: Dec. 16, 2016

(65) Prior Publication Data

US 2017/0179722 A1   Jun. 22, 2017

Related U.S. Application Data

(60) Provisional application No. 62/269,421, filed on Dec. 18, 2015.

(51) Int. Cl.
*H02J 3/32* (2006.01)
(52) U.S. Cl.
CPC ..................... *H02J 3/32* (2013.01)
(58) Field of Classification Search
CPC ........................................................ H02J 3/32
See application file for complete search history.

(56) References Cited

U.S. PATENT DOCUMENTS 5,798,633 A * 8/1998 Larsen ................. H02J 3/28
307/87

7,840,313 B2   11/2010 Horio et al.
8,159,178 B2 * 4/2012 Serban ..................... G05F 1/67
320/101

(Continued)

FOREIGN PATENT DOCUMENTS

WO   2012106389 A2   8/2012

OTHER PUBLICATIONS

The International Bureau of WIPO, International Preliminary Report on Patentability for International Application No. PCT/US2016/067283 dated Jun. 28, 2018.

(Continued)

*Primary Examiner* — Jared Fureman
*Assistant Examiner* — Michael J Warmflash (57) ABSTRACT

Electrical systems and related operating methods are provided. One exemplary electrical system includes a sensing arrangement coupled to an electrical grid interface to measure an electrical characteristic of the electrical grid interface, a power conversion module having an output coupled to the electrical grid interface, and a control module coupled to the sensing arrangement and the power conversion module. The control module determines an estimated frequency of the electrical characteristic based on a phase error corresponding to a measured value of the electrical characteristic obtained from the sensing arrangement, determines a frequency correction power command based on a difference between the estimated frequency and a target frequency, and operates the power conversion module in accordance with the frequency correction power command. The frequency correction power command regulates the frequency of the electrical characteristic of the electrical grid interface to the target frequency, for example, by charging or discharging a battery.

11 Claims, 3 Drawing Sheets

(56) References Cited

U.S. PATENT DOCUMENTS

| | | |
|---|---|---|
| 2001/0056330 A1 | 12/2001 | Wills |
| 2010/0138070 A1* | 6/2010 | Beaudoin ............... F03D 7/0284 |
| | | 700/297 |
| 2011/0115301 A1 | 5/2011 | Bhavaraju et al. |
| 2014/0200722 A1 | 7/2014 | Bhavaraju |
| 2014/0265596 A1 | 9/2014 | Yuan et al. |
| 2015/0249416 A1 | 9/2015 | Barker |
| 2017/0179720 A1* | 6/2017 | Porter ..................... G01R 23/02 |
| 2017/0179847 A1* | 6/2017 | Porter ..................... H02J 3/383 |

OTHER PUBLICATIONS

Steven W. Blume, Electric Power System Basics for the Nonelectrical Professional, IEEE Press Series of Power Engineering, pp. 186-201, Institute of Electrical and Electronics Engineers, Inc., 2007, John Wiley & Sons, Inc., Hoboken, New Jersey, USA.

United States International Searching Authority, International Search Report and Written Opinion for International Application No. PCT/US16/67283 dated Apr. 28, 2017.

United States International Searching Authority, International Search Report and Written Opinion for International Application No. PCT/US2016/067291 dated Mar. 9, 2017.

* cited by examiner

ELECTRICAL SYSTEMS AND RELATED FREQUENCY REGULATION METHODS

CROSS-REFERENCE TO RELATED APPLICATION(S)

This application claims the benefit of U.S. Provisional Patent Application Ser. No. 62/269,421, filed Dec. 18, 2015, the entire content of which is incorporated by reference herein.

TECHNICAL FIELD

The subject matter described herein relates generally to electrical systems, and more particularly, to regulating the frequency of electrical signals on an electrical grid.

BACKGROUND

Advances in technology have led to substantial changes to electrical distribution systems as they evolve towards a so-called "smart grid" that supports distributed energy generation from solar, wind, and other distributed energy sources in a resilient and adaptive manner. One advancement is the deployment of localized electrical systems or "microgrids," which are capable of disconnecting from a larger utility grid (or backbone grid) and operating autonomously, alternatively referred to as "islanding." In many instances, these microgrid systems may also include local energy sources, which can be utilized to augment the utility grid.

In practice, it is not uncommon to have an imbalance between the available power at a particular point or area on an electrical grid and the demand for power from various loads at that particular point or area. As a result, the frequency of the electrical grid can deviate from the nominal (or intended) frequency. For example, excessive power generation in a local area can raise the frequency of the supply voltage signals in that area, and conversely, too little power generation in the local area can depress the frequency of the supply voltage signals. This is undesirable, particularly when the local area includes one or more electrical loads that are sensitive to frequency changes. Accordingly, it is desirable to provide systems and methods capable of regulating the frequency of electrical signals on the electrical grid. Furthermore, other desirable features and characteristics of the present invention will become apparent from the subsequent detailed description and the appended claims, taken in conjunction with the accompanying drawings and the foregoing technical field and background.

BRIEF SUMMARY

Electrical systems and related operating methods are provided. An exemplary electrical system includes a sensing arrangement coupled to an electrical grid interface to measure an electrical characteristic of the electrical grid interface, a power conversion module having an output coupled to the electrical grid interface, and a control module coupled to the sensing arrangement and the power conversion module. The control module determines an estimated frequency of the electrical characteristic based on a phase error corresponding to a measured value of the electrical characteristic from the sensing arrangement, determines a frequency correction power command configured to regulate the frequency of the electrical characteristic of the electrical grid interface to the target frequency based on a difference between the estimated frequency and a target frequency, and operates the power conversion module in accordance with the frequency correction power command.

In another embodiment, an electrical system includes one or more voltage sensing arrangements coupled to the electrical grid interface node to obtain a recent measurement of a voltage at the electrical grid interface node and an energy storage system. The energy storage system includes a battery, an inverter module coupled between the battery and the electrical grid interface node, and a control module coupled to the voltage sensing arrangement(s) and the inverter module. The output of the inverter module is coupled to the electrical grid interface node. The control module determines an estimated frequency of the voltage at the electrical grid interface node based on a phase error corresponding to the recent voltage measurement, determines a frequency correction power command based on a difference between the estimated frequency and a target frequency, adjusts the frequency correction power command based on a difference between current state of charge of the battery and a target state of charge, and operates the inverter in accordance with the adjusted frequency correction power command.

An embodiment of a method of operating an electrical system to regulate a frequency of an electrical characteristic at an interface with an electrical grid is also provided. The method involves obtaining, via one or more sensing arrangement coupled to the interface, a recent measurement of the electrical characteristic, determining a phase error of the electrical characteristic based on the recent measurement, and determining an estimated frequency of the electrical characteristic based on the phase error. The method continues by determining a frequency correction power command configured to regulate the frequency of the electrical characteristic of the electrical grid interface to the target frequency based on a difference between the estimated frequency and a target frequency and operating a power conversion module coupled between the interface and an energy storage element based on the frequency correction power command.

BRIEF DESCRIPTION OF THE DRAWINGS

Embodiments of the subject matter will hereinafter be described in conjunction with the following drawing figures, wherein like numerals denote like elements, and wherein.

DETAILED DESCRIPTION

Embodiments of the subject matter described herein relate to operating an electrical system to regulate frequency of distributed electrical signals on an electrical grid. In this regard, the electrical system consumes or supplies additional power from/to the grid to influence the frequency of the electrical signals in a manner that compensate for fluctuations in the power demands or power generation in the vicinity of the electrical system on the grid. In exemplary embodiments, an estimated frequency of the voltage signals on the electrical grid is calculated or otherwise determined and dynamically updated substantially in real-time using the current (or most recent) measurements of the instantaneous voltage at the grid interface. The frequency allows for the imbalance in the power flow associated with the electrical system to be determined as well as adjusted substantially in real-time (e.g., on the next control cycle), thereby allowing for the frequency to be regulated with a shorter response time (e.g., as compared to using a wattmeter).

Figure 1:
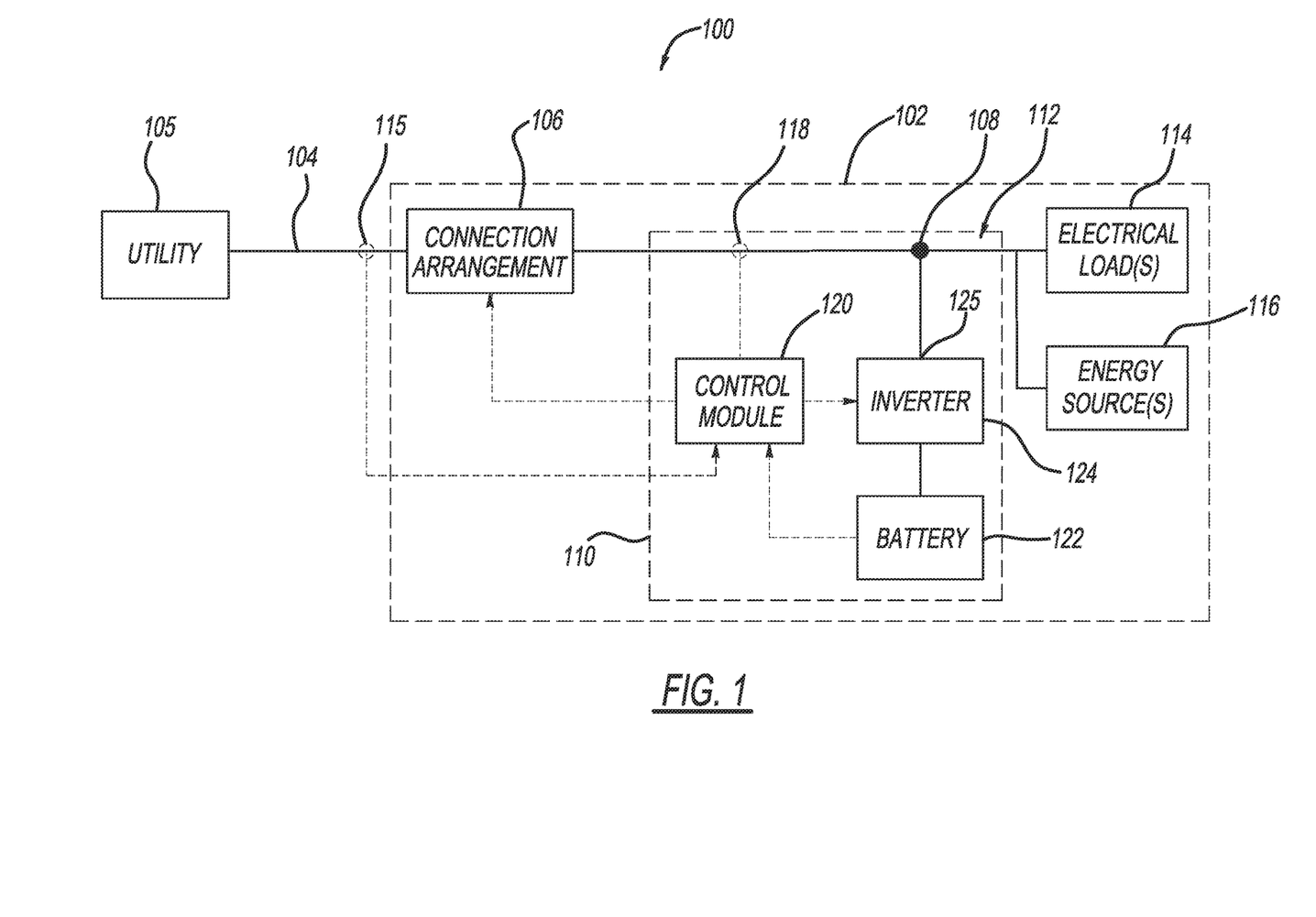
FIG. 1 is a schematic view of an electrical distribution system in one or more exemplary embodiments.

FIG. 1 depicts an exemplary embodiment of an electrical distribution system 100 that includes a microgrid electrical system 102 capable of being selectively connected to an external electrical grid 104 via a connection arrangement 106. The electrical grid 104 generally represents the distribution lines (or feeders), transformers, and other electrical components that provide an electrical interconnection between the microgrid system 102 and one or more external electrical power source(s) 105, which may be provided, for example, by a public utility. Accordingly, for purposes of explanation but without limitation, the electrical power source(s) 105 external to the microgrid system 102 may alternatively be referred to herein as the "utility" and the electrical grid 104 may alternatively be referred to herein as the "utility grid;" however, the subject matter is not limited to traditional utility distribution systems, and in various embodiments, the electrical power source(s) 105 may include one or more additional microgrid systems, distributed energy sources, or the like. Additionally, for purposes of explanation but without limitation, "upstream" or variants thereof may be used herein with reference to locations on or along the electrical grid 104 outside of the microgrid system 102 on a first side of the connection arrangement 106, while "downstream" or variants thereof may be used herein with reference to locations within the microgrid system 102 on the opposite side of the connection arrangement 106.

It should be noted that FIG. 1 depicts a simplified representation of the electrical distribution system 100 for purposes of explanation and is not intended to be limiting. For example, in practice, both the electrical grid 104 and the microgrid system 102 may be realized as three-phase electric systems, with corresponding wiring, lines, and other electrical components to support three-phase operation. Thus, although individual elements, connecting lines, or the like may be depicted in FIG. 1, practical embodiments of the electrical distribution system 100 may include such elements in triplicate, as will be appreciated in the art.

The illustrated microgrid system 102 includes an energy storage system 110 that is connected to the electrical grid 104 downstream of the connection arrangement 106 at an interface node 108 (or interconnect point) where electrical signals on the electrical grid 104 interfaces with electrical signals on the microgrid distribution arrangement 112. In this regard, the microgrid distribution arrangement 112 generally represents the buses, wiring, lines, and/or other electrical components capable of providing electrical interconnections between the electrical grid 104 and/or the energy storage system 110 to one or more electrical loads 114 and/or one or more electrical energy sources 116 within the microgrid system 102. The electrical loads 114 generally represent any devices, systems, components or appliances that receive electrical power from the microgrid distribution arrangement 112 for operation, such as, for example, one or more computer systems or other computing equipment (e.g., computers, servers, databases, networking components, or the like), medical equipment or devices, household appliances, or the like. The energy sources 116 generally represent any devices, systems, or components capable of generating electrical power that may be provided back out to the microgrid distribution arrangement 112, for example, to support operations of the electrical load(s) 114 or to deliver electrical power back to the grid 104. The energy sources 116 may include, for example, one or more wind turbines, solar panels or other photovoltaic components, electrical generators, fuel cells, batteries, or the like.

In the illustrated embodiment, the energy storage system 110 includes a control module 120 configured to regulate power flow at the electrical grid interface 108, an energy storage element 122, and a power conversion module 124 coupled between the energy storage element 122 and the electrical grid interface 108. In exemplary embodiments, the energy storage element 122 is realized as a battery capable of receiving electrical energy from the electrical grid interface 108 via the power conversion module 124 and storing the received electrical energy; accordingly, for purposes of explanation and without limitation, the energy storage element 122 is alternatively referred to herein as a battery. Additionally, the battery 122 may provide electrical energy to the electrical grid interface 108 via the power conversion module 124. In this regard, the power conversion module 124 supports bidirectional flow of electrical current to/from the electrical grid interface 108.

In exemplary embodiments, the power conversion module 124 is realized as a bidirectional three-phase full bridge inverter capable of rectifying three-phase alternating current (AC) electrical signals at the electrical grid interface 108 to a direct current (DC) signal provided to the battery 122 when the battery 122 is receiving electrical energy from the electrical grid interface 108 (or charging). Conversely, the inverter is also capable of converting DC input signals from the battery 122 into corresponding three-phase AC output signals at the electrical grid interface 108 when the battery 122 is providing electrical energy to the electrical grid interface 108 (or discharging). For purposes of explanation and without limitation, the power conversion module 124 is alternatively referred to herein as an inverter or inverter module. As described in greater detail below, the control module 120 is coupled to the inverter 124 and operates the switching elements or other actuatable components of the inverter 124 to achieve so-called "four quadrant" operation and regulate both the real and reactive power flow at the electrical grid interface 108. It should be noted that although the subject matter may be described herein in the context of an interface 125 of the power conversion module 124 referred to herein as the output for purposes of explanation, depending on the embodiment and particular quadrant of operation for a bidirectional power conversion module 124, current may flow into the power conversion module 124 at the so-called output 125. Accordingly, the term output is not intended to impose any constraint on the power flow at the interface 125 of the power conversion module 124.

The control module 120 generally represents the hardware, circuitry, processing logic, and/or other electronic components configured to control operation of the inverter 124 to regulate the power flow to/from the microgrid system 102 and support regulating the frequency at the grid interface 108, as described in greater detail below. Depending on the embodiment, the control module 120 may be implemented or realized with a processor, a controller, a microprocessor, a microcontroller, a content addressable memory, a digital signal processor, an application specific integrated circuit, a field programmable gate array, any suitable programmable logic device, discrete gate or transistor logic, processing core, discrete hardware components, or any combination thereof, and configured to carry out the functions, techniques, and processing tasks associated with the operation of the microgrid system 102 described in greater detail below. Furthermore, the steps of a method or algorithm described in connection with the embodiments disclosed herein may be embodied directly in hardware, in firmware, in a software module executed by the control module 120, or in any practical combination thereof. In accordance with one or more embodiments, the control module 120 includes or otherwise accesses a data storage element, such as a memory (e.g., RAM memory, ROM memory, flash memory, registers, a hard disk, or the like) or another suitable non-transitory short or long term storage media capable of storing computer-executable programming instructions or other data for execution that, when read and executed by the control module 120, cause the control module 120 to execute, facilitate, or perform one or more of the processes, tasks, operations, and/or functions described herein.

Still referring to FIG. 1, the connection arrangement 106 generally represents one or more switching elements configured to electrically isolate the electrical grid 104 from the microgrid system 102 (e.g., the electrical grid interface 108 and/or the microgrid distribution arrangement 112) under control of the control module 120. In exemplary embodiments, the impedance of the connection arrangement 106 is substantially negligible such that the voltage and/or current of the electrical grid 104 immediately upstream of the connection arrangement 106 is substantially equal to the voltage and/or current of the electrical grid interface 108 downstream of the connection arrangement 106 when the switching elements are closed or otherwise activated to provide an electrical connection between the electrical grid 104 and the electrical grid interface 108. The connection arrangement 106 may include one or more relays, circuit breakers, fuses, or the like which are configured electrically in series between the electrical grid interface 108 and the electrical grid 104 and are electrically actuatable by the control module 120. Thus, in a disconnected or deactivated state, the connection arrangement 106 prevents current flow between the electrical grid 104 and the microgrid system 102, thereby islanding the microgrid system 102 relative to the utility 105. Accordingly, the connection arrangement 106 may alternatively be referred to as an Island Interconnect Device (IID). The control module 120 is coupled to the electrical grid 104 via one or more sensing arrangements 115, 118 to detect or otherwise identify an electrical disturbance on the electrical grid 104 and automatically operate the connection arrangement 106 to disconnect the electrical grid interface 108 from the grid 104. In this regard, the sensing arrangements 115, 118 include one or more voltage sensors and/or current sensors configured to measure, sense, or otherwise quantify the respective electrical characteristic of a respective electrical phase and generate corresponding output signals provided to the control module 120. Upon the connection arrangement 106 has effectively disconnecting the microgrid system 102 from the electrical grid 104, the control module 120 may operate the inverter 124 in a voltage-source control mode to emulate the utility 105 and support maintaining normal operation independent of the electrical grid 104 in an islanded state. In this regard, the energy storage system 110 may function as an uninterruptible power supply (UPS) when the microgrid system 102 is disconnected from the electrical grid 104.

As described in greater detail below in the context of FIG. 2, in one or more embodiments, based on the measurements obtained from a sensing arrangement 115, 118, the control module 120 calculates or otherwise determines an estimated frequency of the voltage signals on the electrical grid 104. For example, the control module 120 may dynamically calculate an estimated period for the voltage signals at the electrical grid interface 108 based on changes in the phase angle over preceding sampling intervals, and then calculate or otherwise determine an average frequency associated with the voltage at the electrical grid interface 108 as the inverse of a moving sum of the estimated period values. Additionally, the control module 120 continually monitors or analyzes the estimated frequency to detect or otherwise identify when the power conversion module 124 should be operated to regulate the frequency based on a difference between the estimated frequency and a target frequency, as described in greater detail below.

In response to detecting a frequency regulation condition, the control module 120 calculates or otherwise determines a frequency correction power command for operating the inverter 124 based on a difference between the estimated frequency and the target frequency for the voltage at the electrical grid interface 108. For example, in response to detecting the estimated frequency of the grid voltage is less than the nominal frequency by at least a threshold amount, the control module 120 determines a frequency correction power command to increase the power output by the inverter 124 (e.g., by discharging the battery 122) based on the difference between the estimated and nominal frequencies. Conversely, when the estimated frequency of the grid voltage is greater than the nominal frequency by at least a threshold amount, the control module 120 determines a frequency correction power command to increase the power consumption by the inverter 124 (e.g., by charging the battery 122). In exemplary embodiments, the control module 120 is coupled to the battery 122 (or a battery sensor, a direct current (DC) bus voltage sensor, or the like) to obtain, identify, or otherwise determine the current state of charge of the battery 122 and adjust or otherwise modify the frequency correction power command to account for the current state of charge of the battery 122 relative to a target state of charge. Thus, the control module 120 is capable of regulating the grid frequency in a manner that accounts for the current battery state of charge to reduce the likelihood of undesirably overcharging or undercharging the battery 122.

Figure 2:
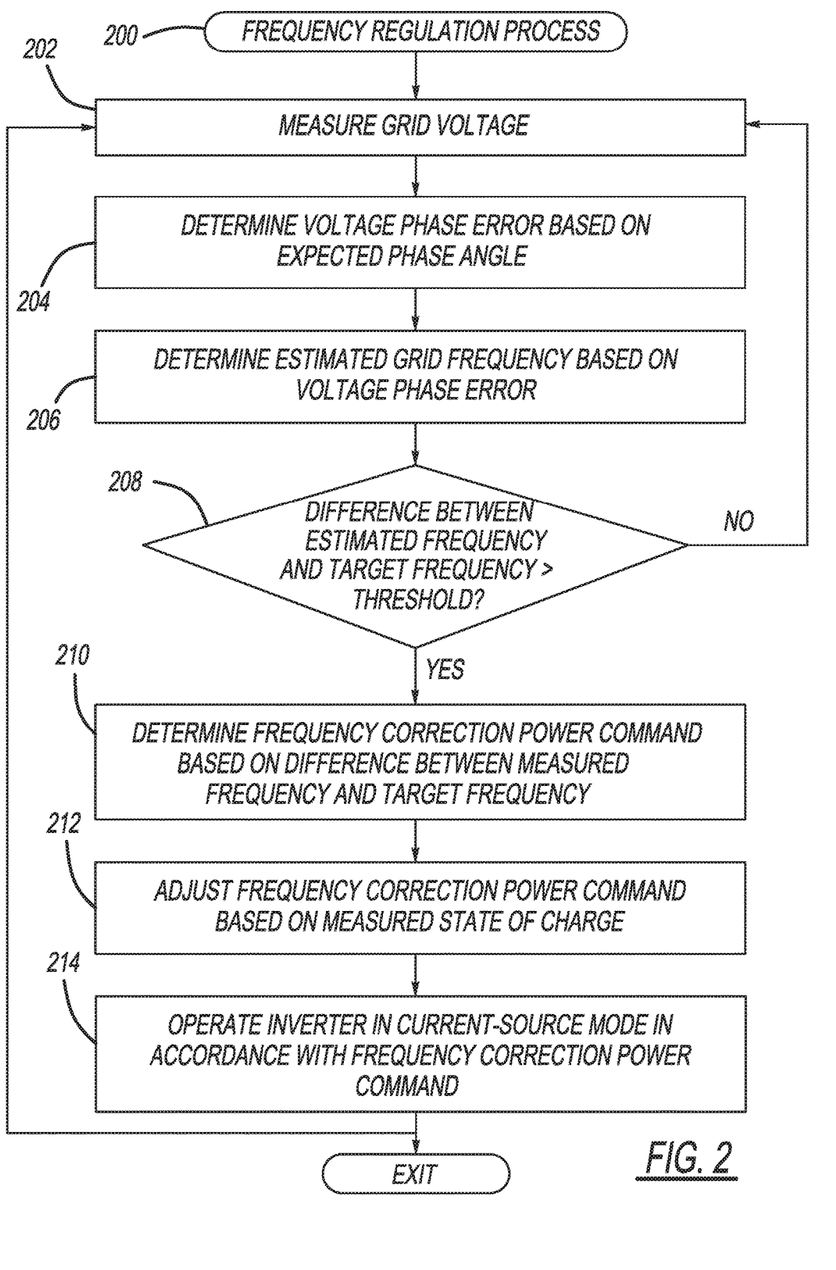
FIG. 2 is a flow diagram of a frequency regulation process suitable for use with the electrical distribution system of FIG. 1 in an exemplary embodiment.

Referring now to FIG. 2, in an exemplary embodiment, the microgrid system 102 is configured to support a frequency regulation process 200 and perform additional tasks, functions, and operations described below. The various tasks performed in connection with the illustrated process 200 may be implemented using hardware, firmware, software executed by processing circuitry, or any combination thereof. For illustrative purposes, the following description may refer to elements mentioned above in connection with FIG. 1. In practice, portions of the frequency regulation process 200 may be performed by different elements of the microgrid system 102, such as, the control module 120, the battery 122, the inverter 124, the connection arrangement 106, and/or one or more of the sensing arrangements 115, 118. It should be appreciated that the frequency regulation process 200 may include any number of additional or alternative tasks, the tasks need not be performed in the illustrated order and/or the tasks may be performed concurrently, and/or the frequency regulation process 200 may be incorporated into a more comprehensive procedure or process having additional functionality not described in detail herein. Moreover, one or more of the tasks shown and described in the context of FIG. 2 could be omitted from a practical embodiment of the frequency regulation process 200 as long as the intended overall functionality remains intact.

Referring now to FIG. 2, in the illustrated embodiment, the frequency regulation process 200 receives or otherwise obtains a recent measurement of the grid voltage and calculates or otherwise determines a phase error associated with the grid voltage based on the measured grid voltage (tasks 202, 204). In exemplary embodiments, the control module 120 measures the grid voltage by receiving or otherwise obtaining samples of the instantaneous voltage at the grid interface 108 from a voltage sensing arrangement 115, 118. For example, for a three-phase utility grid 104, the control module 120 may obtain samples of the instantaneous voltages of the individual phases at the grid interface 108 from corresponding voltage sensors 118 associated with the respective phases. Thereafter, the control module 120 determines a phase error indicative of a difference between the measured grid voltage and an expected grid voltage, where the difference is attributable to the frequency of the grid voltage deviating from a reference frequency. Expressed another way, the phase error corresponds to the difference between a measured phase angle and an expected phase angle for the grid voltage. In exemplary embodiments, the reference frequency corresponds to a previously determined frequency of the electrical grid 104, which is also utilized by the control module 120 to match or lock the frequency of the voltage at the inverter output 125 to the grid voltage. Based on the phase error, the frequency regulation process 200 calculates or otherwise determines an estimated frequency of the grid voltage (task 206).

Figure 3:
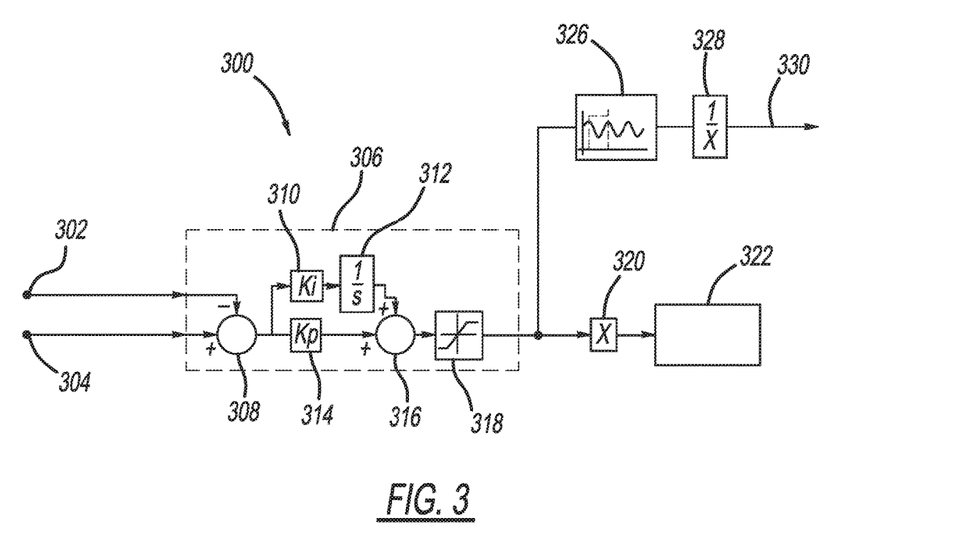
FIG. 3 is a block diagram of an exemplary phase-locked loop control system suitable for use with the frequency regulation process of FIG. 2 in one or more exemplary embodiments.

Referring to FIG. 3, in exemplary embodiments, the control module 120 utilizes a phase-locked loop (PLL) control system 300 in a rotating reference frame to lock the inverter frequency to the frequency of the grid voltage. In this regard, the control module 120 performs a Clarke transformation to transform the instantaneous measured three-phase voltages to a two-phase stationary reference frame, the performs a Park transformation to transform the two-phase voltages from the stationary reference frame to corresponding voltage measurement values in a rotating reference frame using a reference phase angle. The reference phase angle represents the expected position of the grid voltage at that particular sampling of the grid voltage, for which the quadrature component is anticipated to be equal to zero, as discussed in greater detail below. The Clarke transformation can be performed with the following equations:

$$V_{ds} = \frac{2}{3}V_{as} - \frac{1}{3}(V_{bs} + V_{cs}),$$

$$V_{qs} = \frac{1}{\sqrt{3}}(V_{bs} - V_{cs}), \text{ and}$$

$$V_{os} = \frac{1}{3}(V_{as} + V_{bs} + V_{cs}),$$

where $V_{as}$, $V_{bs}$, and $V_{cs}$ represent the instantaneous measured voltage values for the individual phases of the electrical grid 104. The Park transformation from the dqo reference frame can be performed with the following equations:

$$V_{dr} = V_{ds} \cos \theta + V_{qs} \sin \theta, \text{ and}$$

$$V_{qr} = V_{qs} \cos \theta V_{ds} \sin \theta,$$ where $V_{dr}$ is the measured direct (or in-phase) voltage component, $V_{qr}$ is the measured quadrature (or out-of-phase) voltage component, and $\theta$ represents the reference phase angle for the expected position of the grid voltage. As described in greater detail below, the reference phase angle is dynamically updated or adjusted upon each iteration of the frequency regulation process 200 to correspond to the estimated frequency (or period) of the grid voltage with respect to the sampling frequency. In exemplary embodiments, the reference phase angle is chosen to make the quadrature voltage component zero, so that any variations in the quadrature voltage component represent phase measurement error.

The quadrature voltage component value ($V_{qr}$) is then provided to the measured voltage input 302 to a proportional-integral (PI) regulation block 306 the PLL system 300 and subtracted from a reference quadrature voltage value at input 304 at summation block 308. In exemplary embodiments where the control module 120 attempts to maintain the inverter voltage output in lock with the grid voltage, the reference quadrature voltage value at input 304 is fixed at zero. The output of the summation block 308 is a phase error associated with the measured grid voltage which indicates a change in the frequency of the grid voltage that has caused the measured grid voltage to deviate from the expected position (i.e., the reference phase angle for the Park transformation).

The PI regulation block 306 includes an integral term path including an integral gain block 310 that multiplies the phase error by an integral gain coefficient, $K_I$, before an integration block 312 that produces an integral term that is combined at summation block 316 with a proportional term obtained by a proportional gain block 314 that multiplies the phase error by a proportional gain coefficient, $K_P$. The gain coefficients are chosen to convert the quadrature voltage phase error into a corresponding time period value required for the grid voltage to advance in the rotating reference frame by an angle corresponding to the sampling frequency of the control system 300. In this regard, the time period value represents a fractional period of an electrical cycle of the grid voltage corresponding to a ratio of the electrical cycle with respect to the sampling frequency (or update frequency) for the control system 300. For example, in exemplary embodiments, the control module 120 samples the sensing arrangements 115, 118 at a rate of 4800 Hz, or 80 times in a 60 Hz cycle, with the fractional time period output by the summation block 316 corresponding to the amount of time required for the grid voltage to advance in the rotating reference frame by $\frac{1}{80}^{th}$ of an electrical cycle (e.g., 4.5°), where $K_I=0.00144$ and $K_P=0.0028$.

Still referring to FIG. 3, the output of the PI regulation block 306 represents the amount of time for the grid voltage to advance in the rotating reference frame by the incremental angle corresponding to the sampling frequency of the control system 300 (e.g., $\frac{1}{80}^{th}$ of an electrical cycle for a 4800 Hz sampling frequency), which also represents the amount of time the control module 120 should wait before resampling the voltage sensing arrangements 115, 118. In this regard, the illustrated PI regulation block 306 includes a limiter block 318 configured to limit the fractional period (and thereby, the inverter frequency) to being within a fixed range of the nominal frequency (e.g., within +/−a threshold percentage or frequency of the nominal frequency). A gain block 320 converts the time for the incremental advancement in the rotating reference frame to a corresponding processor time in the processor clock time domain, which, in turn is then stored in or otherwise provided to a timer 322 that triggers the next sampling of the sensing arrangements 115, 118 and the next iteration of the frequency regulation process 200. In this regard, the next iteration of the frequency regulation process 200 is performed after the time output by the PI regulation block 306 has elapsed since the preceding (or current) iteration. Upon the next iteration of the frequency regulation process 200, the reference angle for the Park transform is also updated by the amount of incremental advancement in the rotating reference frame expected to occur during the time value output from the PI regulation block 306 (e.g., $\theta_i=\theta_i=\theta_{i-1}+4.5°$ for a 4800 Hz sampling rate).

Still referring to FIG. 3, the control module 120 determines an estimated frequency for the grid voltage by inputting or otherwise providing the time period for the grid voltage to advance by the incremental angle to a sliding window filter block 326 that determines an estimated period of the grid voltage based on preceding outputs of the PI regulation block 306. For example, for a 4800 Hz sampling frequency, the sliding window filter block 326 may determine the estimated period by adding the current time value output by the PI regulation block 306 to the preceding 79 values, resulting in a running sum equal to the amount of time for the grid voltage to traverse the most recent electrical cycle (i.e., the estimated period of the most recent electrical cycle). That said, there are numerous different ways for determining the estimated period of the grid voltage, and the subject matter is not limited to any particular implementation. For example, the most recent time values corresponding to half of an electrical cycle (e.g., the preceding 40 iterations for a 4800 Hz sampling rate) can be summed and multiplied by two to obtain the estimated period of the grid voltage for an electrical cycle. The output of the sliding window filter block 326 is provided to an inverse determination block 328, which determines the inverse of the estimated period of the grid voltage, resulting in the estimated frequency (or measured frequency) of the grid voltage at output 330.

Referring again to FIG. 2, after determining the estimated frequency of the grid voltage, in exemplary embodiments, the frequency regulation process 200 determines whether the estimated frequency deviates from a target frequency for the electrical grid by at least a threshold amount (task 208). The target frequency may be realized as the nominal frequency of the electrical grid 104 (e.g., 60 Hz) or some other target value provided by a local utility. The threshold value may be chosen to allow for some deviation from the target frequency, and in some embodiments, may also be provided or dictated by the local utility. As an example, the threshold value may be equal to 0.5 Hz for a target frequency of 60 Hz. However, it should be noted that in some embodiments the threshold value may be set to 0, in which case the control module 120 may attempt to continuously regulate the frequency at the grid interface 108, as described below. When the difference is less than the threshold amount, the loop defined by tasks 202, 204, 206, 208 repeats for the next sampling of the sensing arrangements 115, 118. In such situations (e.g., when the estimated frequency at the output 330 is between 59.5 Hz and 60.5 Hz), the estimated frequency from output 330 may be utilized by the control module 120 to operate the inverter 124 substantially in sync with the grid voltage and achieve a desired power flow to/from the battery 122 as dictated by local energy demands or surplus within the microgrid system 102.

Still referring to FIG. 2, when the difference between the estimated frequency and the target frequency exceeds the frequency regulation threshold, the frequency regulation process 200 calculates or otherwise determines a frequency correction power command for operating the power conversion module based on the difference (task 210). In this regard, when the difference is positive and the estimated frequency exceeds the target frequency by more than the threshold amount, the control module 120 determines a frequency correction power command to decrease the power output by the inverter 124 and/or charge the battery 122, thereby loading the grid interface 108 to decrease the frequency of the grid voltage. Conversely, when the difference is negative and the estimated frequency is below the target frequency by more than the threshold amount, the control module 120 determines a frequency correction power command to increase the power output by the inverter 124 and/or discharge the battery 122, thereby decreasing the load on the electrical grid 104 and raising the frequency of the grid voltage.

In exemplary embodiments, the frequency regulation process 200 receives or otherwise obtains a current state of charge associated with the battery and adjusts or otherwise modifies the frequency correction power command based on a difference between the current state of charge and a target state of charge (task 212). For example, the target state of charge may be realized as a minimum state of charge for the battery 122 that will allow the energy storage system 110 to function as an uninterruptible power supply for a particular duration of time (e.g., 4 hours) if the microgrid system 102 needs to be disconnected (or islanded) from the grid 104. Thus, the frequency regulation provided by the energy storage system 110 may be counterbalanced by its need to be able to function independently of the grid 104. In this regard, in some embodiments, the frequency correction power command may be modified, or even overridden by state of charge concerns. For example, a frequency correction power command that would further discharge the battery 122 may be disabled or otherwise negated when the current state of charge is less than or equal to a minimum state of charge, or vice versa.

After determining the frequency correction power command, the frequency regulation process 200 operates the power conversion module in accordance with the frequency correction power command to adjust or otherwise influence the frequency of the grid voltage towards the target frequency (task 214). In this regard, the control module 120 provides the frequency correction power command to the commanded power input of the inverter control system (or control loop), which, in turn, determines commands for operating the inverter 124 in accordance with the commanded power and the estimated frequency to adjust the power flow to the battery 122 in sync with the grid voltage. In exemplary embodiments, the inverter 124 is operated in a current-source control mode, where the frequency correction power command input to the current-source control loop influences the amount of current flow to/from the battery 122 at the grid voltage which corresponds to the frequency correction power command. The loop defined by tasks 202, 204, 206, 208, 210, 212, and 214 may repeat until the estimated frequency is within the threshold amount of the target grid frequency. Moreover, in some embodiments, loop defined by tasks 202, 204, 206, 208, 210, 212, and 214 repeats until the estimated frequency is equal to the target frequency.

Figure 4:
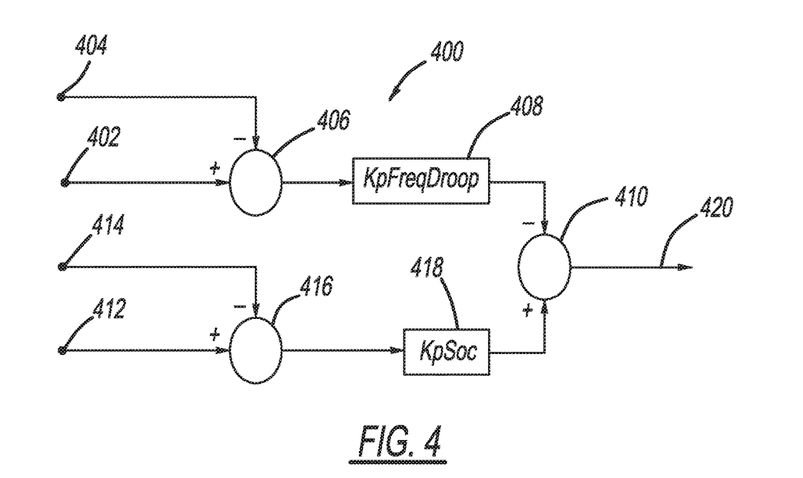
FIG. 4 is a block diagram of an exemplary frequency correction power control system suitable for use with the frequency regulation process of FIG. 2 in one or more exemplary embodiments.

FIG. 4 depicts an exemplary embodiment of a frequency correction power control system 400 that may be implemented by the control module 120 in conjunction with the frequency regulation process 200 to regulate the frequency of the grid voltage. Referring to FIG. 4 with reference to FIGS. 1-3, the estimated frequency from output 330 is provided at a first input 402 of the power control system 400 and subtracted from a target frequency provided to input 404 at block 406. The output of block 406 represents the difference between the estimated frequency and the target frequency, and the difference is multiplied by a gain at gain block 408 to obtain the frequency correction power command provided to block 410. In exemplary embodiments, either the gain block 408 or the summation block 410 is configured so that a positive difference between the estimated frequency and the target frequency (e.g., the frequency of the grid voltage is too high) results in a power command with a negative value corresponding to charging the battery 122 (e.g., to decrease the grid frequency). Conversely, a negative difference between the estimated frequency and the target frequency (e.g., the frequency of the grid voltage is too slow) results in a power command with a positive value corresponding to discharging the battery 122.

A measured state of charge received by the control module 120 from the battery 122 (e.g., via a battery sensor) is provided at another input 412 to the power control system 400 and subtracted from a target state of charge provided to input 414 at block 416. The output of block 416 represents the difference between the current battery state of charge and the target state of charge, and the difference is multiplied by a gain at gain block 418 to obtain an adjustment to the frequency correction power command that accounts for the current state of charge and is combined with the frequency correction power command at block 410. In this regard, a positive difference between the current state of charge and the target state of charge results in a positive adjustment to the frequency correction power command that reduces the rate of charging the battery 122 (or alternatively increases the rate of discharging the battery 122) dictated by the frequency differential. Conversely, a negative difference between the current state of charge and the target state of charge results in a negative adjustment to the frequency correction power command that reduces the rate of discharging the battery 122 (or increases the rate of charging of the battery 122) dictated by the frequency differential. In this regard, the gain of the frequency correction gain block 408 may be chosen to achieve a desired responsiveness to the frequency differential, while the gain of the state of charge adjustment gain block 408 may be chosen to achieve a desired amount of state of charge compensation applied to the frequency correction power command.

The output 420 of the power control system 400 represents a commanded power value provided to the input of the inverter current-source control system. The power value may be converted to the rotating reference frame using the equation Power=$V_{dr}I_{dr}+V_{qr}I_{qr}$. In exemplary embodiments where the commanded quadrature voltage component value ($V_{qr}$) is equal to zero, the frequency correction power command from output 420 is provided to the input of a current regulation control system configured to regulate the direct current ($I_{dr}$) flow to/from the energy storage system 110 (e.g., a direct current regulator). The direct current regulator generates a direct component voltage command based on the value of the frequency correction power command, the measured direct voltage value ($V_{dr}$) from the Park transform described above, and a measured direct current value ($I_{dr}$) configured to regulate the direct component of the current flow to/from the energy storage system 110 and/or battery 122 that results in the commanded frequency correction power flow. The commanded direct voltage ($V_{dr}$) is utilized by the control module 120 to operate the inverter module 124 during the subsequent interval before resampling the sensing arrangements 115, 118 (e.g., the amount of time output from PI regulation block 306) to achieve a direct current ($I_{dr}$) corresponding to the frequency correction power command.

In practice, the control module 120 may also implement a quadrature current regulator that regulates the quadrature current ($I_{qr}$) flow to/from the energy storage system 110 based on a commanded reactive power, the measured quadrature voltage value ($V_{qr}$), and the measured quadrature current value ($I_{qr}$). The output of the quadrature current regulator is a commanded quadrature voltage ($V_{qr}$) for operating the inverter module 124 during the subsequent interval and achieve a desired quadrature current ($I_q$) corresponding to the reactive power command. The commanded voltage outputs of the direct current regulator and the quadrature current regulator may be transformed back to the stationary reference frame, for example, by performing the reverse of the Park and Clarke transformations, resulting in three phase voltage commands that dictate operation of the respective phases of the inverter 124 during the subsequent control period (e.g., the amount of time output from PI regulation block 306). In the current-source control mode, the three phase voltage commands regulate the direct and quadrature current flow to/from the energy storage system 110 and/or battery 122 to values corresponding to the commanded real and reactive powers.

Referring to FIGS. 1-4, during normal operation when the estimated frequency of the grid voltage is within the threshold frequency of the target grid frequency, the control module 120 generates real and reactive power commands that achieve a desired power flow to/from the energy storage system 110 and/or battery 122 based on one or more criteria, such as, for example, the power demands of the microgrid loads 114, the power generation of the microgrid energy sources 116, the current state of charge of the battery 122, and the like, either individually or in combination. In a similar manner as described above, the real power command is provided to the direct current regulator and the reactive power command is provided to the quadrature current regulator for generating three phase voltage commands that dictate operation of the respective phases of the inverter 124 during the subsequent control period to regulate the direct and quadrature current flow to/from the energy storage system 110 and/or battery 122 to values corresponding to the commanded real and reactive powers. As described above, the control module 120 implements the control system 300 and dynamically updates the estimated frequency of the grid voltage (e.g., tasks 202, 204, 206) after each sampling, which, in turn, is utilized to operate the inverter 124 in sync with the utility grid 104 and/or utility 105.

When the control module 120 detects the estimated frequency of the grid voltage deviates from the target grid frequency by more than a threshold frequency, the control module 120 transitions to a frequency regulating operating mode by activating the power control system 400 and generating a frequency correction real power command based on the difference between the estimated frequency and the target grid frequency as described above (e.g., tasks 208, 210, 212). At the same time, the control module 120 may maintain determination of reactive power commands in a similar manner as was done prior to the difference between the estimated and target grid frequencies exceeding the threshold. The frequency correction real power command is provided to the direct current regulator and the reactive power command is provided to the quadrature current regulator for generating three phase voltage commands that dictate operation of the respective phases of the inverter 124 during the subsequent control period to regulate the direct and quadrature current flow to/from the energy storage system 110 and/or battery 122 (e.g., task 214). In this regard, the direct current regulator results in a direct voltage component of the three phase voltage commands that achieves the desired rate of charging or discharging of the battery 122 to reduce the difference between the estimated frequency of the grid voltage and the target grid frequency, as described above. Once the estimated frequency is equal to the target grid frequency (or alternatively, back within the threshold of the target grid frequency), the control module 120 may deactivate the frequency correction power control system 400 and revert to determining the real power command in accordance with the normal operating mode.

To briefly summarize, the subject matter described herein allows for the frequency at the grid interface to be determined substantially in real-time without having to wait for one or more electrical cycles to be completed before updating the frequency estimate. For example, the frequency of a 60 Hz signal may be updated at a sampling frequency greater than the electrical frequency (e.g., 4800 Hz) as compared to being otherwise updated upon completion of one or more complete electrical cycles (e.g., 60 Hz or slower). This, in turn, allows for the system to quickly respond to changes in electrical frequency and maintain operation substantially in sync with the grid voltage. Additionally, operations to regulate the frequency of the electrical grid may also account for the current state of charge of the battery or other energy storage, thereby achieving a desired counterbalance between quickly correcting the grid frequency and potentially overcharging or undercharging the battery.

For the sake of brevity, conventional techniques related to three-phase electrical systems, electrical energy generation and distribution, smart grids, microgrids, circuit breakers, electromechanical switches, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The foregoing description may refer to elements or components or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements with direct electrical connections, additional intervening elements, devices, features, or components may be present in an embodiment of the depicted subject matter. In addition, certain terminology may also be used in the following description for the purpose of reference only, and thus are not intended to be limiting. For example, the terms "first," "second," and other such numerical terms referring to structures do not imply a sequence or order unless clearly indicated by the context.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any theory presented in the preceding background, brief summary, or the detailed description.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It should be understood that various changes may be made in the function and arrangement of elements described in an exemplary embodiment without departing from the scope of the subject matter as set forth in the appended claims. Accordingly, details of the exemplary embodiments or other limitations described above should not be read into the claims absent a clear intention to the contrary.

What is claimed is:

1. An electrical system comprising:
    a sensing arrangement coupled to an electrical grid interface to measure an electrical characteristic of the electrical grid interface;
    a power conversion module having an output coupled to the electrical grid interface; and
    a control module coupled to the sensing arrangement and the power conversion module to:
        determine an estimated frequency of the electrical characteristic based on a phase error corresponding to a measured value of the electrical characteristic from the sensing arrangement;
        determine a frequency correction power command configured to regulate a frequency of the electrical characteristic of the electrical grid interface to a target frequency based on a difference between the estimated frequency and the target frequency; and
        operate the power conversion module in accordance with the frequency correction power command, wherein the control module determines a fractional period of an electrical cycle of the electrical characteristic based on the phase error and determines the estimated frequency based on the fractional period.

2. The electrical system of claim 1, further comprising an energy storage element, the power conversion module being coupled between the energy storage element and the electrical grid interface, wherein the control module adjusts the frequency correction power command based on a metric associated with the energy storage element prior to operating the power conversion module in accordance with the frequency correction power command.

3. The electrical system of claim 2, wherein:
    the energy storage element comprises a battery; and
    the metric comprises a current state of charge of the battery.

4. The electrical system of claim 3, wherein the power conversion module comprises an inverter.

5. The electrical system of claim 1, wherein:
    the electrical characteristic comprises a voltage;
    the measured value comprising a measured voltage; and
    the control module determines the phase error as a quadrature component of the measured voltage.

6. The electrical system of claim 1, wherein:
    the control module includes a filter to determine an estimated period of the electrical cycle based on the fractional period; and the estimated frequency comprises an inverse of the estimated period.

7. An electrical system comprising:
one or more voltage sensing arrangements coupled to an electrical grid interface node to obtain a recent measurement of a voltage at the electrical grid interface node; and
an energy storage system comprising:
  a battery;
  an inverter module coupled between the battery and the electrical grid interface node, the inverter module having an output coupled to the electrical grid interface node; and
  a control module coupled to the one or more voltage sensing arrangements and the inverter module to:
    determine an estimated frequency of the voltage at the electrical grid interface node based on a phase error corresponding to the recent measurement;
    determine a frequency correction power command based on a first difference between the estimated frequency and a target frequency;
    adjust the frequency correction power command based on a second difference between current state of charge of the battery and a target state of charge; and
    operate the inverter module in accordance with the adjusted frequency correction power command, wherein the control module determines a fractional period of an electrical cycle of the voltage at the electrical grid interface node based on the phase error and determines the estimated frequency based on the fractional period.

8. The electrical system of claim 7, wherein the control module determines the phase error as a quadrature component of the recent measurement in a rotating reference frame.

9. The electrical system of claim 8, wherein the control module determines the quadrature component based on an expected phase of the voltage.

10. The electrical system of claim 7, wherein the control module determines an estimated period of the electrical cycle based on the fractional period and determines the estimated frequency as an inverse of the estimated period.

11. The electrical system of claim 10, wherein the control module determines the phase error as a quadrature component of the recent measurement in a rotating reference frame.

* * * * *